United States Patent [19]

Otani et al.

[11] Patent Number: 4,977,356

[45] Date of Patent: Dec. 11, 1990

[54] DRIVER CIRCUIT FOR D.C. MOTOR

[75] Inventors: Kenzi Otani; Fimihiko Ito, both of Kyoto, Japan

[73] Assignee: Rohm Co., Ltd., Kyoto, Japan

[21] Appl. No.: 485,529

[22] Filed: Feb. 27, 1990

[51] Int. Cl.$^5$ ............................................ H02K 29/00
[52] U.S. Cl. ..................................... 318/138; 318/254
[58] Field of Search .......... 318/138, 139, 254, 254 A, 318/261, 81, 84, 85, 97, 439, 495, 521, 677, 680, 691, 712, 716, 724; 388/801, 806, 804, 811, 843

[56] References Cited

U.S. PATENT DOCUMENTS

| | | | |
|---|---|---|---|
| 3,309,592 | 3/1967 | Farre | 318/138 |
| 3,541,408 | 11/1970 | Schwendtner | 318/138 |
| 3,938,014 | 2/1976 | Nakajima | 318/254 A |
| 4,230,976 | 10/1980 | Müller | 318/254 A |
| 4,435,673 | 3/1984 | Hagino et al. | 318/138 X |
| 4,511,828 | 4/1985 | Wada | 318/138 X |
| 4,544,868 | 10/1985 | Murty | 318/138 X |
| 4,730,150 | 3/1988 | Lee et al. | 318/138 X |

Primary Examiner—William M. Shoop, Jr.
Assistant Examiner—A. Jonathan Wysocki
Attorney, Agent, or Firm—Dickstein, Shapiro & Morin

[57] ABSTRACT

A driver circuit for a D.C. motor includes a first output transistor forming an inflow path for a driving current to the stator coil, and a second output transistor forming an outflow path for the driving current from the stator coil. The two output transistors are incorporated in a semiconductor integrated circuit; each output transistor is an n-p-n transistor in order to increase its current density. One current-mirror circuit including a pair of p-n-p transistors is connected to the first output transistor. Another current-mirror circuit including a pair of n-p-n transistors is connected to the second output transistor. To each output transistor a driving control signal is supplied via the respective current-mirror circuit. The result is that the ratio of inflow and outflow currents is determined by the mirror ratio of the current-mirror circuits, thus resulting in minimized ratio fluctuation. Also the mirror ratio can be controlled by the emitter area ratio of the current-mirror circuits.

5 Claims, 3 Drawing Sheets

DRIVER CIRCUIT FOR D.C. MOTOR

BACKGROUND OF THE INVENTION

1. Field of the Invention:

This invention relates to a driver circuit for a D.C. motor which circuit includes a semiconductor integrated circuit.

2. Description of the Related Art

In general, a circuit for controlling a D.C. motor comprises an amplifier circuit for amplifying pole detection signals of a rotor such as from Hall elements, a waveform composing circuit for forming a predetermined driving control signal from the amplified pole detection signal, and a driver circuit for driving stator coils based on the driving control signal.

FIG. 3 shows a typical conventional driver circuit for driving the coil. This driver circuit is a circuit for a three-phase D.C. motor. La, Lb, Lc in FIG. 3 designate respective stator coils; Q1a, Q2a, inflow and outflow output transistors for driving the coil La; Q1b, Q2b, inflow and outflow output transistors for driving the coil Lb; and Q1c, Q2c, inflow and outflow output transistors for driving the coil Lc. The transistors Q1a, Q1b, Q1c located at the power-source side of each transistor output circuit are output transistors forming respective current inflow paths, while the transistors Q2a, Q2b, Q2c located at the ground side of each transistor output circuit are output transistors forming respective current outflow paths. Now assuming that current is flowing in the coils La, Lb, Lc in the direction of arrows, the current from the transistor Q1b flows in the coil Lb, and the current from the transistor Q1c flows in the coil Lc, and their composite current flows out of the transistor Q2a via the coil La.

FIG. 2 shows a conventional driver circuit per one phase for driving the coil of such D.C. motor. Q1 in FIG. 2 designates an output transistor at the current inflow side; Q2, an output transistor at the current outflow side; and Q10, an upstream-stage transistor for driving the output transistor of the current inflow side. Generally, such conventional driver circuit, along with the pole-detection-signal amplifier circuit and the waveform composing circuit, is integrated in a single semiconductor integrated circuit; in which case a p-n-p transistor is low in allowable maximal current per unit area, compared to an n-p-n transistor. To this end, as shown in FIG. 2, an n-p-n transistor is used also for the current inflow output transistor Q1, and in order to invert the driving control signal, a p-n-p transistor Q10 is located upstream of the n-p-n transistor to drive the current inflow output transistor Q1.

However, with the conventional driver circuit of FIG. 2, the current amplification rate ($h_{FE}$) would vary widely depending on the type, i.e. p-n-p or n-p-n, of transistor. Thus, even though there is no difference between the currents I1, I2 flowing in the circuit connected to the upstream part of this driver circuit, the ratio of the driving currents Io1, Io2 would not be constant.

As a consequence, currents flowing in the respective coils would be unbalance to cause ripple variation of torque and also reduction of torque. If the base current I2 of the current outflow output transistor Q2 is adequately large, the current flowing in the coil will be determined the current value of the current inflow output transistor of the other phase. Therefore fluctuation of the coil current is somewhat improved. In this case, since each of the current inflow output transistor Q1 and the current outflow output transistor Q2 cannot be shifted to the ON state smoothly, yet an adequate driving characteristic is difficult to achieve.

SUMMARY OF THE INVENTION

It is therefore an object of this invention to provide a driver circuit, for a D.C. motor, in which circuit any influence due to the difference in current amplification rate between the upstream p-n-p transistor and the n-p-n output transistor is eliminated so that the ratio between the current flowing in the current inflow output transistor of the transistor output circuit and the current flowing in the current outflow output transistor of the transistor output circuit will be constant.

According to this invention, there is provided a driver circuit for a D.C. motor, comprising: a first output transistor including an n-p-n transistor connected at a collector to a power source and at an emitter to a stator coil so as to form an inflow path for a driving current from the power source to the stator coil; a second output transistor including an n-p-n transistor connected at a collector to the stator coil and at an emitter to the ground so as to form an outflow path for the driver current from the stator coil to the ground; a first current-mirror circuit including a pair of p-n-p transistors in which a collector of an output branch is connected to a base of the first output transistor and in which a driving control signal is supplied to a collector of an input branch transistor; and a second current-mirror circuit including a pair of n-p-n transistors in which a common emitter of the two transistors is connected to a base of the second output transistor and in which a driving control signal is supplied to a collector of an input branch transistor.

With this driver circuit, from the first current-mirror circuit composed of a pair of p-n-p transistors, the collector current of the output branch transistor flows as the base current of the current-inflow-side first output transistor of the transistor output circuit. And the emitter current from the second current-mirror circuit composed of a pair of n-p-n transistors flows as the base current of the current-outflow-side second output transistor of the transistor output circuit. The current ratio at that time is determined only by the individual mirror ratios of the current-mirror circuits. Regarding both the current-mirror circuit composed of p-n-p transistors and the current-mirror circuit composed of n-p-n transistors, their mirror ratio themselves can be determined with good precision, even if there is any difference in current amplification rate of the individual transistors. Therefore the ratio between the current of the current inflow output transistor of the transistor output circuit and the current of the current outflow output transistor can be determined with accuracy, thus causing an improved stability without reducing the torque of the motor.

The above and other advantages, features and additional objects of this invention will be manifest to those versed in the art upon making reference to the following detailed description and the accompanying drawings in which a preferred structural embodiment incorporating the principles of this invention is shown by way of illustrative example.

DETAILED DESCRIPTION

Figure 1:
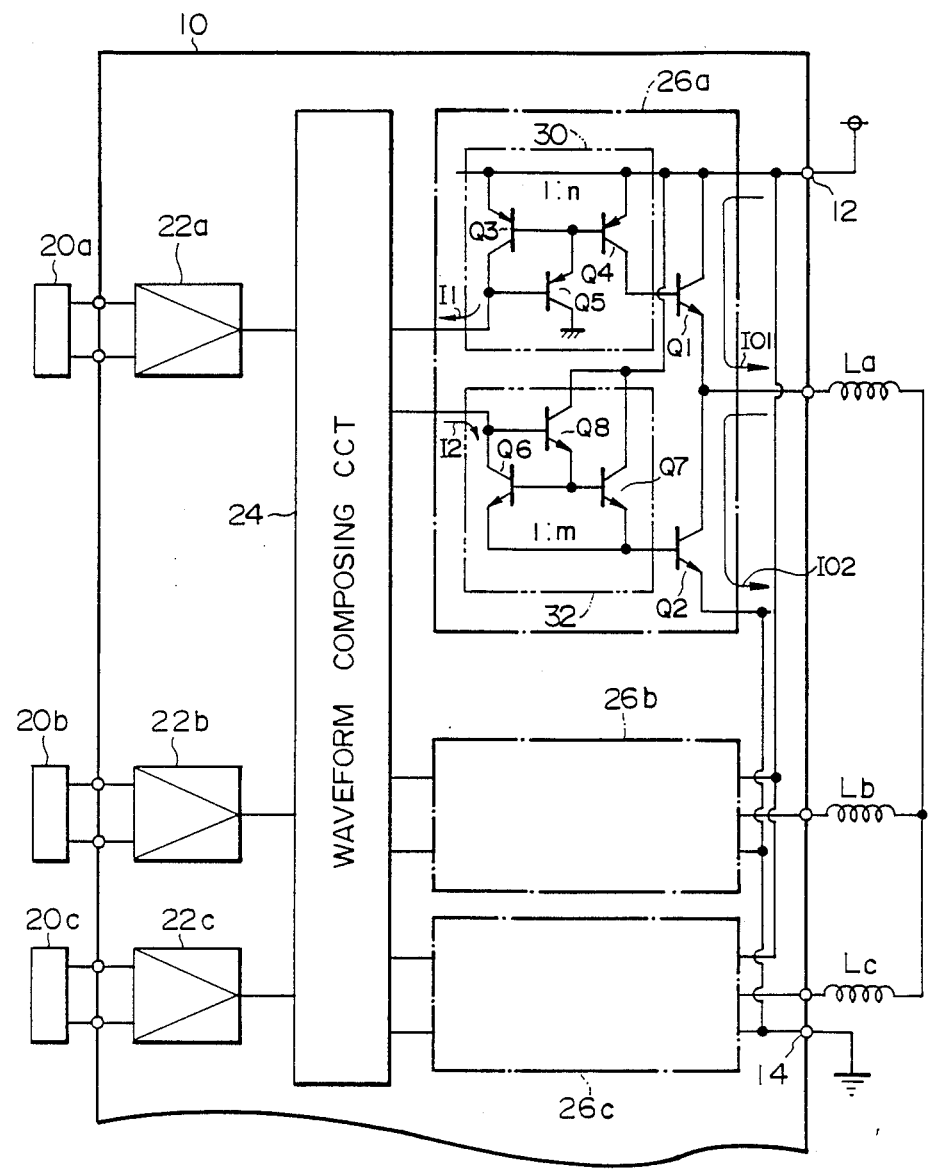
FIG. 1 is a circuit diagram of a D.C. motor control circuit, showing a servo IC in which a D.C. motor driver circuit of this invention is used in a three-phase D.C. motor, and external associated circuits.

FIG. 1 shows a part of a servo IC 10 in which a D.C. motor driver circuit of this invention is incorporated, with the detailed description of other control circuit parts being omitted for clarity.

The servo IC 10 supplies driving currents to three stator coils La, Lb, Lc for driving a three-phase D.C. motor. Three Hall elements 20a, 20b, 20c are connected to the servo IC 10 on the outside for detecting the rotation phase of a rotor in each phase.

The detection signal of the individual Hall element 20a, 20b, 20c is amplified by the respective amplifier circuit 22a, 22b, 22c. From these amplified signals, motor driving control signals are formed by a waveform composing circuit 24.

The driving control signals outputted from the waveform composing circuit 24 are supplied to respective driving circuits 26a, 26b, 26c for each phase to control the driving current flowing to the respective stator coils La, Lb, Lc.

In this illustrated embodiment, since these driving circuits 26a, 26b, 26c are identical in circuit structure, only the driving circuit 26a will now be described in detail.

In the driving circuit 26a of FIG. 1, a driving current inflow path for supplying the driving current from a power source to the stator coil La includes an n-p-n transistor Q1. This first output transistor Q1 is connected at the collector to the power source and at the emitter to the stator coil La.

Meanwhile, in order to form a driving current outflow path for the driving current from the stator coil La to flow to the ground, a second output transistor Q2 including an n-p-n transistor is provided. The second output transistor Q2 is connected at the collector to the stator coil La and at the emitter to the ground.

Therefore, the emitter of the output transistor Q1 and the collector of the output transistor Q2 are interconnected.

For a significant feature of this invention, a pair of current-mirror circuits is connected to the first and second output transistors Q1, Q2, respectively, and the driving control signals from the waveform composing circuit 24 are supplied to the respective output transistors Q1, Q2 via these current-mirror circuits.

A first current-mirror circuit 30 is provided for the first output transistor Q1 and includes a pair of p-n-p transistors Q3, Q4 respectively forming an input branch transistor and an output branch transistor.

The input branch transistor Q3 is connected at the emitter to the power source and at the collector to the waveform composing circuit 24.

The output branch transistor Q4 is connected at the emitter to the power source and at the collector to the base of the first output transistor Q1.

As is well known in the art, the two transistors Q3, Q4 are interconnected at their bases to form a current-mirror circuit. A p-n-p transistor Q5 is connected between the base and collector of the input branch transistor Q3, and more particularly, the transistor Q5 is connected at the emitter to the common base of the current-mirror transistors Q3, Q4 and at the base to the collector of the input branch transistor Q3, the last-named collector being connected to the ground.

A second current-mirror circuit 32 connected to the second output transistor Q2 includes a pair of n-p-n transistors Q6, Q7 respectively forming an input branch transistor and an output branch transistor.

In the second current-mirror circuit 32, the collector of the input branch transistor Q6 is connected to the waveform composing circuit 24, while the collector of the output branch transistor Q7 is connected to the power source.

The common collector of the two transistors Q6, Q7 is connected to the base of the second output transistor Q2.

As is well known in the art, also in the second current-mirror circuit 32, the two transistors Q6, Q7 are interconnected at their common base, and this common base is in turn connected to the emitter of a transistor. And the transistor Q8 is connected at the base to the collector of the input branch transistor Q6 and at the collector to the power source.

With the foregoing arrangement, when the driving control signal is supplied from the waveform composing circuit 24 to the first current-mirror circuit 30, a control current I1 flows in the input branch transistor Q3 so that a base current is supplied from the output branch transistor Q4 to the first output transistor Q1 commensurate with the mirror current at that time.

Meanwhile, when the driving control signal is supplied from the waveform composing circuit 24 to the second current-mirror circuit 32, a control current I2 flows in the collector of the input branch transistor Q6, and a base current flows from the common emitter of the two transistors Q6, Q7 to the second output transistor Q2 commensurate with the mirror ratio of the second current-mirror circuit 32.

Therefore, according to this invention, the base currents to be supplied to the individual output transistors Q1, Q2 are determined only by the mirror ratio of the individual current-mirror circuit 30, 32, i.e. (1:n), (1: m) according to the embodiment Consequently the fluctuation of the driving current due to the current amplification rate of the transistor upstream of the output transistor can be remarkably reduced.

Practically, the mirror ratio of the first current-mirror circuit 30 is determined by the emitter area ratio of the transistors Q3, Q4; and the mirror ratio of the second current-mirror circuit 32 is determined by the emitter area ratio of the transistors Q6, Q7. Assuming that the mirror ratios of the first and second current-mirror circuits 30, 32 are 1:n and 1:m, respectively, and that the collector currents of the transistors Q3, Q6 are I1 and I2, respectively, the relationship between the control currents I1, I2 and the driving current Io1, Io2 can be expressed by the following:

$$Io1 = n \times I1 \times h_{FE}1 \ldots \quad (1)$$

$$Io2 - (1+m) \times I2 \times h_{FE}2 \quad \ldots (2)$$

where $h_{FE}1$ is a current amplification rate of the transistor Q1, and $h_{FE}2$ is a current amplification rate of the transistor Q2. If $h_{FE}1$ and $h_{FE}2$ are equal, $$Io1: Io2 = n \times I1 : (1+m) \times I2 \ldots (3)$$

Consequently, the ratio between the current flowing in the coil and the current flowing out thereof is determined only by the respective mirror ratios, if there is no difference in current to be determined due to the upstream circuits.

Since all the circuits shown in FIG. 1 are formed in a single semiconductor integrated circuit so that the emitter area ratio of the transistors Q3, Q4 and the emitter area ratio of the transistors Q6, Q7 can be determined with accuracy, it is possible to determine the mirror ratio with precisely even if there is any difference in current amplification rate between the p-n-p transistor and the n-p-n transistor.

Figure 2:
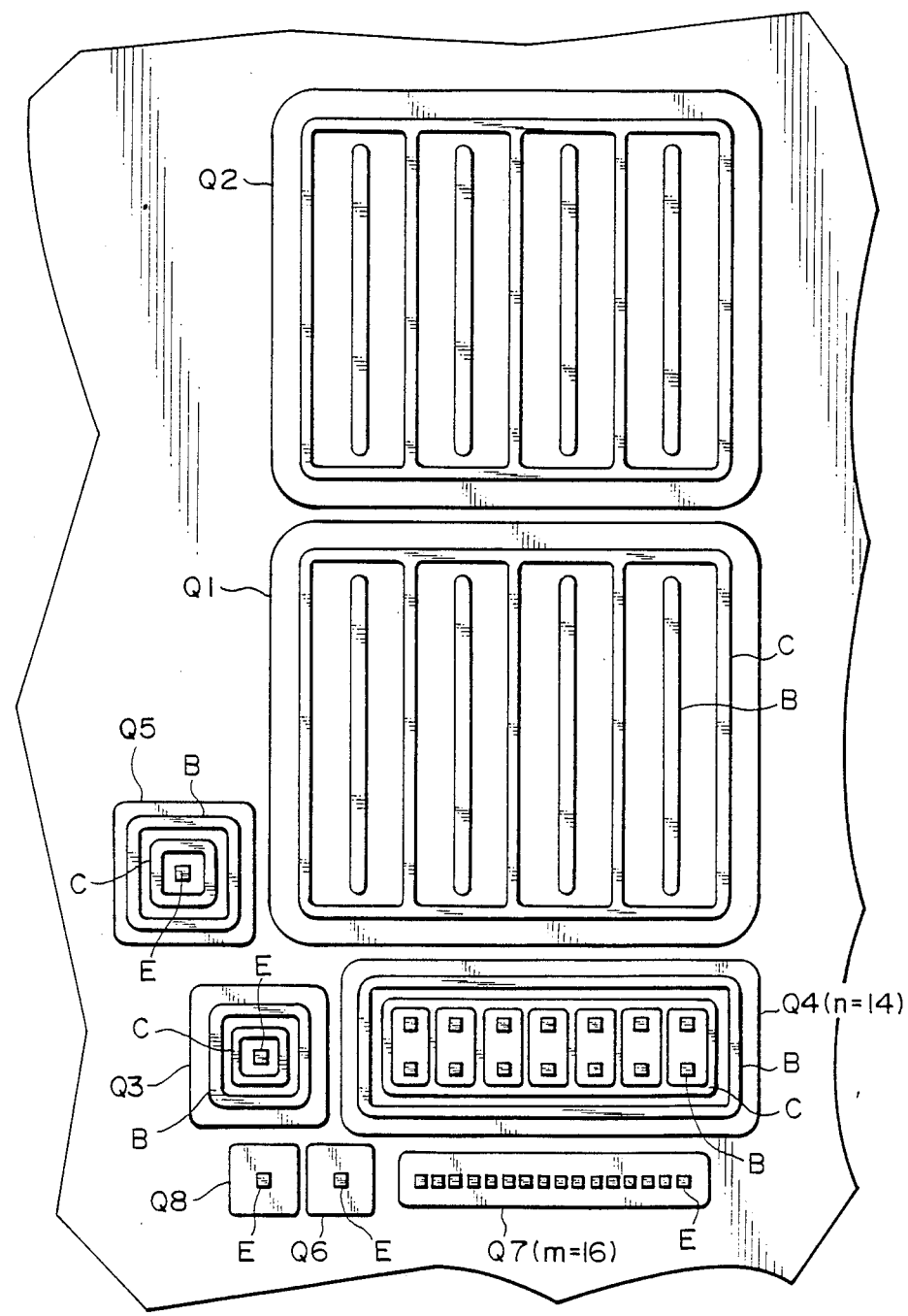
FIG 2 is an example of mask pattern in which the driver circuit of this invention is integrated on a semiconductor IC chip.
Figure 4:
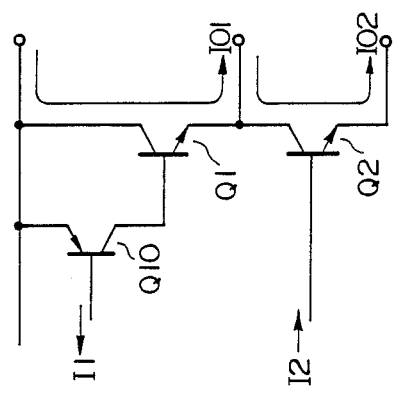
FIG 4 is a circuit diagram of a driver circuit using a pair of n-p-n output transistors of the conventional circuit of FIG. 3.
Figure 3:
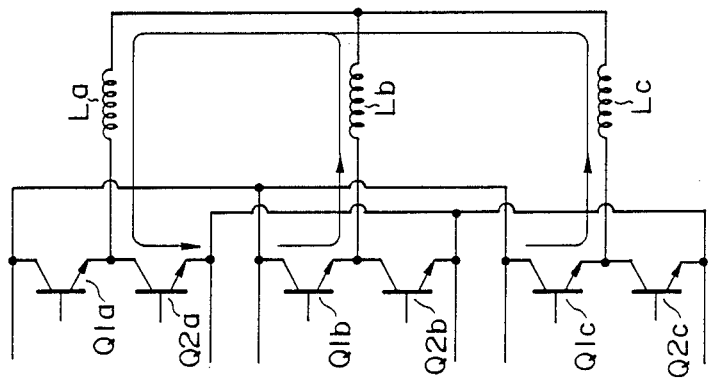
FIG. 3 is a circuit diagram showing the output side of a typical conventional three-phase D.C. motor driver circuit.

FIG. 2 shows an example of mask pattern in which the driving circuit 26a of FIG. 1 is integrated on a semiconductor IC chip.

As is apparent from FIG. 2, the two output transistors Q1, Q2 of the driving circuit 26a and the p-n-p transistors Q3, Q4, Q5 of the first current-mirror circuit 30 as well as the n-p-n transistors Q6, Q7, Q8 of the second current-mirror circuit 32 are all formed on a common IC substrate.

In FIG. 2, the collector of the individual transistor is designated by C; the emitter, by E; and the base, B.

Therefore, the mirror ratios of the two current-mirror circuits 30, 32 can be controlled by the emitter areas of the transistors Q3, Q4 and the emitter areas of the transistors Q6, Q7. In the illustrated embodiment, the mirror ratios n and m are determined to be 14 and 16, respectively, and may be set otherwise as desired when deciding the mask pattern.

Following are the advantageous results which can be achieved with the driver circuit of this invention.

(1) Since the ratio between the current flowing in the current-inflow-side first output transistor of the transistor output circuit and the current flowing in the current-outflow-side second output transistor is determined both by the mirror ratio of the first current-mirror circuit composed of the p-n-p transistors and the mirror ratio of the first current-mirror circuit composed of the n-p-n transistors, it is possible to stabilize the driving current for the coil, with no influence due to fluctuation of the current amplification rate of the upstream-stage transistor, thereby preventing torque fluctuation of the motor and torque reduction.

(2) When controlling the motor by detecting the voltage applied to the coil, its voltage waveform is stable so that rotation of the rotor can be controlled with precision.

What is claimed is:
1. A driver circuit for a D.C. motor, comprising:
 (a) a first output transistor including an n-p-n transistor connected at a collector to a power source and at an emitter to a stator coil so as to form an inflow path for a driving current from the power source to the stator coil;
 (b) a second output transistor including an n-p-n transistor connected at a collector to the stator coil and at an emitter to the ground so as to form an outflow path for the driver current from the stator coil to the ground;
 (c) a first current-mirror circuit including a pair of p-n-p transistors in which a collector of an output branch is connected to a base of said first output transistor and in which a driving control signal is supplied to a collector of an input branch transistor; and
 (d) a second current-mirror circuit including a pair of n-p-n transistors in which a common emitter of the two transistors is connected to a base on said second output transistor and in which a driving control signal is supplied to an collector of an input branch transistor.

2. A driver circuit according to claim 1, wherein said first current-mirror circuit includes a p-n-p transistor connected between the base and collector of the input branch transistor, and wherein said second current-mirror circuit includes an n-p-n transistor connected between the base and collector of the input branch transistor.

3. A driver circuit according to claim 1, wherein said first and second output transistors and said first and second current-mirror circuits are all integrated in a single semiconductor integrated circuit.

4. A driver circuit according to claim 3, wherein a mirror ratio of each of said current-mirror circuits is determined by an emitter area ratio between the input and output branch transistors of each said current-mirror circuit.

5. A driver circuit according to claim 1, wherein there are parallel three stator coils interconnected at the other ends to provide a driver circuit for a three-phase D.C. motor.

* * * * *